Sept. 12, 1967 H. SCHULZ ET AL 3,341,259
AXIAL SEAL, ESPECIALLY FOR THE BEARING EYES OF ENDLESS TRACKS
Filed Jan. 12, 1965

Inventors:
Horst Schulz
Wilhelm Hahn
By Walter Becker

United States Patent Office 3,341,259
Patented Sept. 12, 1967

3,341,259
AXIAL SEAL, ESPECIALLY FOR THE BEARING EYES OF ENDLESS TRACKS
Horst Schulz, Hennef (Sieg), and Wilhelm Hahn, Cologne-Deutz, Germany, assignors to Klockner-Humboldt-Deutz Aktiengesellschaft, Cologne, Germany
Filed Jan. 12, 1965, Ser. No. 424,987
Claims priority, application Germany, Jan. 16, 1964, K 51,849
6 Claims. (Cl. 305—11)

The present invention relates to an axial seal between two members adapted to be turned relative to each other by a limited angle, and, more specifically, concerns an axial seal for the bearing eyes of chain links of full-track vehicles, which links are coupled by chain bolts. With an axial seal of the type involved, a ring of elastic material is arranged in recesses in said bearing eyes.

With axial seals of the above-mentioned type, it is customary that the elastic ring provided between the bearing eyes as protection against the entry of soil into and escape of lubricant from the bearing zones of the track links or shoes is loosely located under axial pre-load in the recesses of said bearing eyes. The loose mounting of the elastic ring, therefore, when a relative angular movement of the track links or shoes occurs in view of the rolling movement of the track, brings about that a relative movement of the end faces of the elastic ring occurs with regard to the bearing eyes. This relative movement will, in conformity with the multiplicity of movements, cause an undesired wear of the end faces of the elastic ring and will, depending on the hardness of the ring, cause said ring to dig into the respective engaging surfaces of the bearing eyes. Due to said wear and the digging in of the elastic ring, the axial seal between the bearing eyes becomes ineffective after a relatively short period of operation, as a result of which the chain bolts, the shoe bushings and the elastic ring will have to be exchanged, which is not only an expensive operation but also renders the vehicle inoperative over a longer period of time.

It is, therefore, an object of the present invention to provide an axial seal for bearing eyes of track links or shoes of full-track vehicles, which will overcome the above-mentioned drawbacks.

It is another object of this invention to provide an axial seal as set forth in the preceding paragraph, which will avoid or greatly reduce a wear of the seal at its end faces as a result of the wear and the engaging surfaces of the bearing eyes, and thus will also avoid or greatly reduce the wear of the chain bolts and bushings for the track links.

These and other objects and advantages of the invention will appear more clearly from the following specification in connection with the accompanying drawings, in which:

FIGURE 1 diagrammatically illustrates a partial section of a chain link of a track, said section being taken perpendicular to the longitudinal direction of said chain link;

The seal according to the present invention is characterized primarily in that the end faces of the elastic ring are provided with annular metal discs vulcanized or cemented or otherwise fixedly connected thereto, and said annular metal discs are by plastic or elastic deformation tightly and fixedly connected to that part of the bearing eyes which receives said annular metal discs.

According to a further development of the present invention, with track links or shoes, with which the chain bolts are tightly and firmly clamped to the two outer or inner bearing eyes of said track links or shoes, the said annular metal discs received by the bearing eyes fixedly connected to the chain bolts are tightly and firmly connected to said chain bolts by spreading or the like and have their end faces in firm and tight abutment with the bearing eyes. This connection of the annular metal discs received by the bearing eyes yields the additional advantage that simultaneously with pressing-in the chain bolt, a tight and firm connection with the bearing eyes will be obtained.

In order to permit relatively wide tolerances for the manufacture of the receiving diameter of the recesses for the annular metal discs while assuring a safe sealing of the bearing zones of the track links or chains, the present invention furthermore provides that the end faces of the annular metal discs on the outer side thereof engage the bearing eyes through the intervention of thin discs of elastic yieldable material as, for instance a weatherproof sort of rubber material between 30 and 50 Shore.

The said elastic discs may or may not be connected with the annular metal discs. A connection may be effected by vulcanizing, cementing or in any other convenient manner. A connection by vulcanization of said elastic discs to said annular metal discs is to be preferred inasmuch as it greatly simplifies the installation and the stocking of the parts. For purposes of simplifying the vulcanizing process, the metal discs may be provided with axial passages, and the elastic ring may form a single piece with the outer thin elastic discs. Such an arrangement yields the advantage that the rubber metal connection between the elastic ring and the annular metal discs will be relieved with regard to shearing and peeling-off operations whereby the angular movability of the axial seal will be greatly enhanced.

Figure 1:
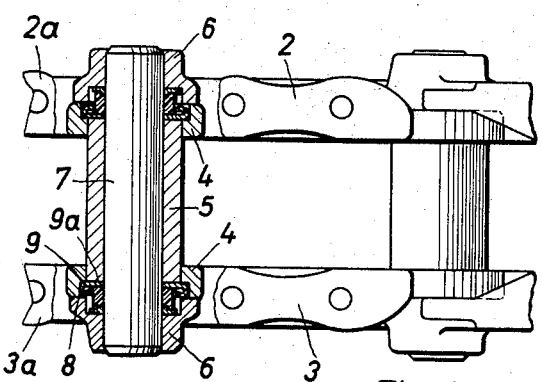

Referring now to the drawing in detail, the endless chain shown in FIG. 1 is provided with the customary cranked track link members 2, 3 symmetrically arranged with regard to the longitudinal central plane of the chain. Said link members 2, 3 have inner bearing eyes 4 into which track link bushings 5 are pressed. The link members 2, 3 are furthermore provided with outer bearing eyes 6 into which the ends of chain bolts 7 are pressed for coupling the chain links together.

As will be seen from the drawing, the inner bearing eyes 4 have annular recesses 8 (FIGS. 1 and 3) the inner end faces 9 of which are flush with the end face 9a of bushing 5. The outer bearing eyes 6 are likewise provided with an annular recess 10 the diameter of which preferably for flanging purposes, corresponds to the outer diameter of bushing 5 or is at least smaller than the latter. Recesses 8 and 10 receive the axial seal 11 according to the present invention which, prior to its installation, has the shape shown in FIG. 2.

Figure 2:
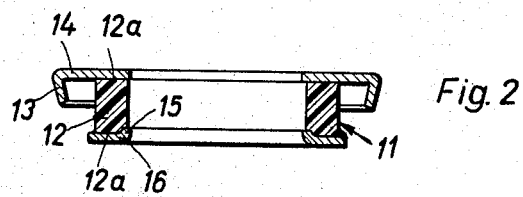
FIGURE 2 illustrates on a considerably larger scale than FIGURE 1 the axial seal proper prior to its installation.

As will be seen from FIG. 2, axial seal 11 comprises a hose-shaped elastic ring 12 the end faces 12a of which are respectively connected to an annular metal disc 14 having an outer flanging collar 13, and to an annular metal disc 16 provided with an inner spread or inwardly directed collar 15. This connection represents a rubber-metal connection which may be effected by cementing, vulcanizing or the like. As will be seen from FIG. 3, the inner diameter of ring 12 is radially spaced from the outer diameter of bolt 7 so that there is a clearance therebetween. From the above it will also be clear that a limited turning movement of the outer bearing eyes 6 relative to the inner bearing eyes 4 is possible by a twisting of elastic ring 12.

Figure 3:
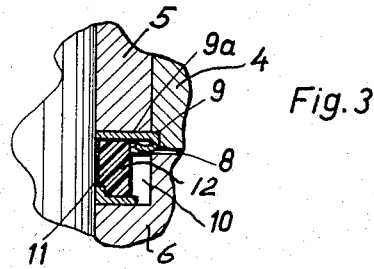
FIGURE 3 shows on an enlarged scale a portion of an axial seal according to the invention in assembled condition.

The installation of the axial seal according to the present invention is effected as follows: First, the link members 2, 3 of a track link or shoe are at their inner bearing eyes 4 interconnected by pressing chain link bushing 5 into said eyes 4. Thereupon, chain bolt 7 is passed through bushing 5. Subsequently, the axial seal 11 is slipped onto chain bolt 7 while spreading the inward collar 15 of the annular metal disc 16, and link members 2a, 3a of the next following chain link having their outer bearing eyes 6 pressed upon chain bolt 7. During this pressing operation, the end faces of the outer bearing eyes 6 cause collars 13 of the annular metal discs 14 to tightly and firmly flange into the recesses 8, as shown in FIG. 3.

Figure 4:
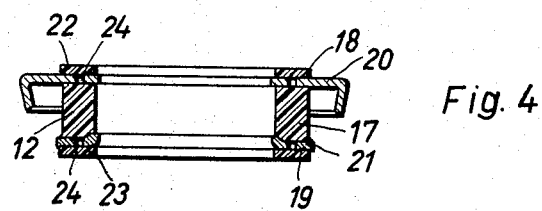
FIGURE 4 is a section through an axial seal modified over that of FIGURE 2.

Referring now to the modification shown in FIG. 4, it will be seen that the axial seal 17 shown prior to its installation has, in distinction to the seal of FIG. 2, the outer end faces 18, 19 of the annular metal discs 20, 21 respectively covered with a thin elastic layer 22, 23. The covering or coating of the annular metal discs 20, 21 is effected during the vulcanization of the elastic ring to the discs, preferably in one working operation. To this end, radial passages 24 are provided in said annular metal discs, through which passages the elastic material of ring 12 will, during the vulcanizing process, pass from the inside toward the outside.

As will be evident from the preceding description, the present invention provides an axial seal in which the sealing end faces of the elastic ring will no longer move relative to the engaging surfaces of the bearing eyes, so that all wear by frictional movement will be avoided. This, in turn, greatly increases the life of the axial seal and thus also of the chain bolt mounting whereby repair costs and costs due to stoppage of the vehicle, will be saved. The simple elastic or plastic connection by flanging or spreading of the annular metal discs of the bearing eyes greatly facilitates the installation of the seal according to the present invention.

It is, of course, to be understood, that the present invention is, by no means, limited to the particular constructions set forth above, but also comprises any modifications within the scope of the appended claims. Thus, instead of the annular metal discs 14, 16, 20 and 21 for connection of the end faces of the axial seals 11, 17 to the bearing eyes, tough, spreadable or flangeable discs of synthetic material may be employed. As synthetic material, in this instance, may be employed a weatherproof sort of rubber material having a Shore hardness of from 30 to 50.

What we claim is:

1. An axial sealing unit, especially for insertion into a first recess and a second recess respectively provided in a first track link and a second track link to be pivotally interconnected by a pin, which includes: an elastic annular body, a first annular metal disc firmly connected to one of the end faces of said annular body for insertion into said first recess, a second annular metal disc firmly connected to the other end face of said annular body for insertion into said second recess, each of said discs and said annular body being provided with an axial bore and the bores of said discs being in substantially axial alignment with each other, said first disc having bendable outer peripheral flange means of L-shaped cross section protruding beyond the outer periphery of said elastic body and having an outer diameter approximately equalling the diameter of said first recess in which said first disc is to be inserted, the shorter arm of said cross sectionally L-shaped portion of said flange means pointing in the direction toward said second annular disc while forming an acute angle with the longer arm of said cross sectionally L-shaped portion, said second annular disc having a radially inwardly extending collar portion protruding beyond the inner diameter of the annular body and folded into said annular body in the direction toward said first annular disc, said collar portion folded into said annular body defining a passage of such a diameter that the pin intended to pivotally interconnect said track links will spread said collar portion substantially radially outwardly further into said annular body when passing through said passage and will in assembled condition be firmly frictionally engaged by said collar portion, the inner diameter of said annular body being such as to permit said pin when passing through said annular body to rotate therein in radially spaced relationship thereto, said flange means being bendable into firm frictional engagement with said first recess.

2. A sealing unit according to claim 1, in which that face of each of said metal discs which faces away from said annular body is covered by elastic means.

3. In combination with first link means having a first recess and second link means to be pivotally connected to said first link means and provided with a second recess, a link unit comprising an elastic annular body and a first annular metal disc firmly connected to one of the end faces of said body and also comprising a second annular metal disc firmly connected to the other end face of said annular body, each of said discs and said annular body being provided with an axial bore and the bores of said discs being in substantially axial alignment with each other, said first disc being located in said first recess and having outer peripheral flange means folded over and extending radially inwardly, said first disc being in firm frictional engagement with said first link means, said second disc being located in said second recess and having its inner marginal portion forming a collar, and a pin extending through both of said discs and rotatably extending through said annular elastic body in radially spaced relationship to said elastic body while being firmly frictionally engaged by said collar of said second disc whereby said pin with said second link means is movable to a limited extent relative to said first link means by twisting of said elastic annular body.

4. An arrangement according to claim 3, which includes elastic means between the bottom of said first and second recess and the respective adjacent metal disc.

5. An axial sealing unit, especially for insertion into a first recess and a second recess respectively provided in a first track link and a second track link to be pivotally interconnected by a pin, which includes: an elastic annular body, a first annular metal disc firmly connected to one of the end faces of said annular body for insertion into said first recess, a second annular metal disc firmly connected to the other end face of said annular body for insertion into said second recess, each of said discs and said annular body being provided with an axial bore and the bore of said discs being in substantially axial alignment with each other, said first disc having bendable outer peripheral flange means of L-shaped cross section protruding beyond the outer periphery of said elastic body and having an outer diameter approximately equalling the diameter of said first recess in which said first disc is to be inserted, the shorter arm of said cross sectionally L-shaped portion of said flange means pointing in the direction toward said second annular disc while forming an acute angle with the longer arm of said cross sectionally L-shaped portion, said second annular disc having a radially inwardly extending collar portion protruding beyond the inner diameter of the annular body and folded into said annular body in the direction toward said first annular disc, said disc portion folded into said annular body defining a passage of such a diameter that the pin intended to pivotally interconnect said track links will spread said collar portion substantially radially outwardly further into said annular body when passing through said passage and will in assembled condition be firmly frictionally engaged by said collar portion, the inner diameter of said annular body being such as to permit said pin when passing through said annular body to rotate therein in radially spaced relationship thereto, said flange means being bendable into firm frictional engagement with said first recess, said metallic discs being provided with perforations and having those faces thereof which face away from said annular body covered by elastic means extending through said perforations and being integral with said annular body.

6. In combination with first link means having a first recess and second link means pivotally connected to said first link means for limited angular movement and provided with a second recess aligned and facing said first recess, a pin extending through said recesses and having a press fit in said first link means, and a bushing surrounding said pin and pressfitted in said second link means with its end forming the bottom wall of said second recess, a sealing unit surrounding said pin and having its ends secured within said facing recesses, respectively comprising a first radial apertured disc in said first recess and having an inner peripheral collar portion pressed on said pin to secure said disc within said first recess, and a second radial apertured disc in said second recess having an outer peripheral flange initially extending toward said first recess and inclined at an acute angle to said second disc and pressed into said second recess, said first recess having a peripheral wall of less diameter than the diameter of said second disc and engaging said outer peripheral flange to press said flange and second disc into said second recess and secure said disc in said recess, a resilient annular member surrounding said pin with its ends in engagement with said discs and movable angularly with said discs, said discs fixed in said recesses twisting said resilient member on relatively angular movement of said links.

References Cited

UNITED STATES PATENTS

| | | | |
|---|---|---|---|
| 2,264,739 | 12/1941 | Boden | 277—92 |
| 2,341,900 | 2/1944 | Boden | 277—92 |
| 2,699,974 | 1/1955 | Deffenbaugh | 305—11 |
| 2,906,562 | 9/1959 | Burgman | 305—11 |

BENJAMIN HERSH, *Primary Examiner.*

R. J. JOHNSON, *Assistant Examiner.*